United States Patent
Jergess et al.

(10) Patent No.: US 10,731,395 B2
(45) Date of Patent: Aug. 4, 2020

(54) SMART HINGE ASSEMBLY FOR A TAILGATE OF A MOTOR VEHICLE

(71) Applicant: FORD GLOBAL TECHNOLOGIES, LLC, Dearborn, MI (US)

(72) Inventors: Rafic Jergess, Warren, MI (US); Spencer Monroe Dinkins, III, Rochester Hills, MI (US); Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 508 days.

(21) Appl. No.: 15/459,120

(22) Filed: Mar. 15, 2017

(65) Prior Publication Data

US 2018/0266161 A1 Sep. 20, 2018

(51) Int. Cl.
| | |
|---|---|
| *E05F 15/611* | (2015.01) |
| *E05F 15/76* | (2015.01) |
| *E05F 15/603* | (2015.01) |
| *B62D 33/027* | (2006.01) |
| *E05D 11/00* | (2006.01) |
| *E05F 15/77* | (2015.01) |

(52) U.S. Cl.
CPC ........ *E05F 15/611* (2015.01); *B62D 33/0273* (2013.01); *E05D 11/00* (2013.01); *E05F 15/603* (2015.01); *E05F 15/76* (2015.01); *E05F 15/77* (2015.01); *E05Y 2900/532* (2013.01); *E05Y 2900/544* (2013.01); *E05Y 2900/546* (2013.01)

(58) Field of Classification Search
CPC ....... E05F 15/611; E05F 15/603; E05F 15/76; E05F 15/77; E05D 11/00; B62D 33/0273; E05Y 2900/544; E05Y 2900/532; E05Y 2900/546

USPC ........................................................ 296/146.1
See application file for complete search history.

(56) References Cited

U.S. PATENT DOCUMENTS

| | | | |
|---|---|---|---|
| 5,004,287 A | 4/1991 | Doyle | |
| 5,352,008 A | 10/1994 | Denvir | |
| 5,415,058 A | 5/1995 | Young et al. | |
| 5,823,022 A | 10/1998 | Barker | |
| 6,357,813 B1 | 3/2002 | Vandeberghe et al. | |
| 6,398,288 B1 | 6/2002 | Yuge | |
| 6,425,205 B2 * | 7/2002 | Wygle ................... | E05F 15/619 296/56 |
| 6,520,557 B2 | 2/2003 | Benthaus et al. | |
| 6,601,268 B2 * | 8/2003 | Seo ...................... | E05D 11/1057 16/334 |
| 6,637,796 B1 | 10/2003 | Westerdale et al. | |
| 6,719,356 B2 | 2/2004 | Cleland et al. | |
| 6,764,122 B2 | 7/2004 | Kharod | |
| 6,814,392 B1 | 11/2004 | Tomaszewski | |

(Continued)

FOREIGN PATENT DOCUMENTS

DE 102015107349 A1 7/2016

OTHER PUBLICATIONS

Non-final Office Action dater Dec. 7, 2018 for U.S. Appl. No. 15/434,878, filed Feb. 16, 2017.

(Continued)

*Primary Examiner* — Farhana A Hoque
(74) *Attorney, Agent, or Firm* — David Coppiellie; King & Schickli, PLLC

(57) ABSTRACT

A smart hinge assembly includes a fixed hinge pin, a rotary drive cup including a hinge pin socket to engage the fixed hinge pin and a drive cup position sensor. That drive cup position sensor is configured to monitor current rotary position of the rotary drive cup.

11 Claims, 12 Drawing Sheets

(56) References Cited

U.S. PATENT DOCUMENTS

| | | |
|---|---|---|
| 6,964,449 B2 | 11/2005 | Takeda et al. |
| 7,069,695 B2 | 7/2006 | Hattori et al. |
| 7,258,373 B2 | 8/2007 | Plett et al. |
| 7,287,803 B2 | 10/2007 | Koneval et al. |
| 7,484,784 B2 | 2/2009 | Dhly |
| 7,500,706 B2 | 3/2009 | Anderson et al. |
| 7,533,920 B2 | 5/2009 | Ohly |
| 7,549,691 B2 | 6/2009 | Schulte et al. |
| 8,008,910 B2 | 8/2011 | Booth et al. |
| 8,104,823 B2 * | 1/2012 | Kohlstrand ......... E05D 11/1007 296/146.1 |
| 8,696,046 B2 | 4/2014 | Sackett |
| 9,097,045 B2 | 8/2015 | Hausler et al. |
| 9,234,378 B2 | 1/2016 | Hansen |
| 2004/0040213 A1 | 3/2004 | McCarthy-Garland et al. |
| 2006/0181108 A1 * | 8/2006 | Cleland .................. E05F 15/43 296/146.4 |
| 2007/0132264 A1 | 6/2007 | Koneval et al. |
| 2008/0054667 A1 | 3/2008 | Ohly |
| 2012/0272479 A1 | 11/2012 | Rasel et al. |
| 2015/0224845 A1 * | 8/2015 | Anderson ............ B60G 17/019 701/37 |
| 2015/0315837 A1 | 11/2015 | Salmon et al. |

OTHER PUBLICATIONS

English Machine Translation of DE102015107349A1.
Non-final Office Action dater Sep. 21, 2018 for U.S. Appl. No. 15/446,269, filed Mar. 1, 2017.

\* cited by examiner

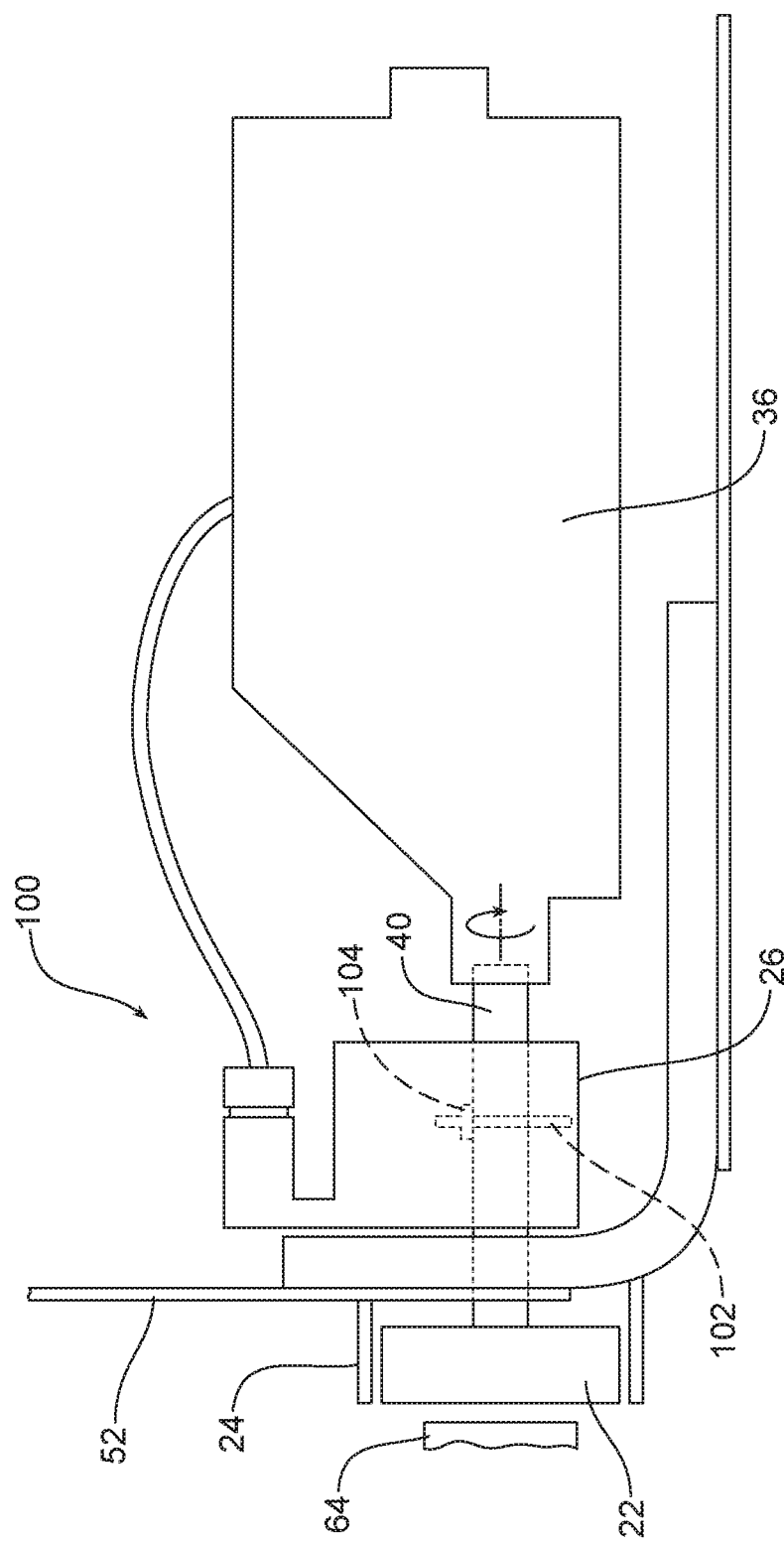

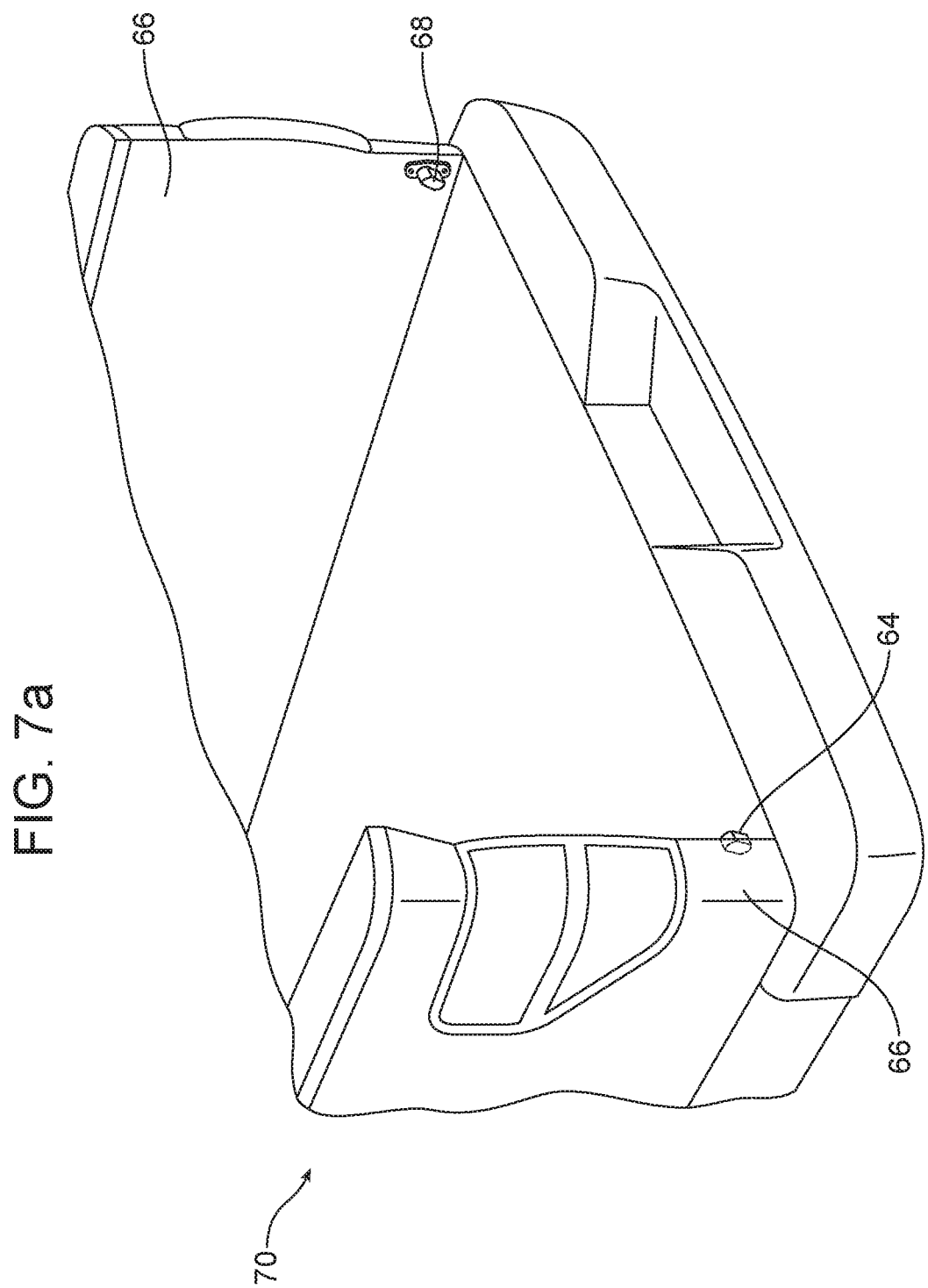

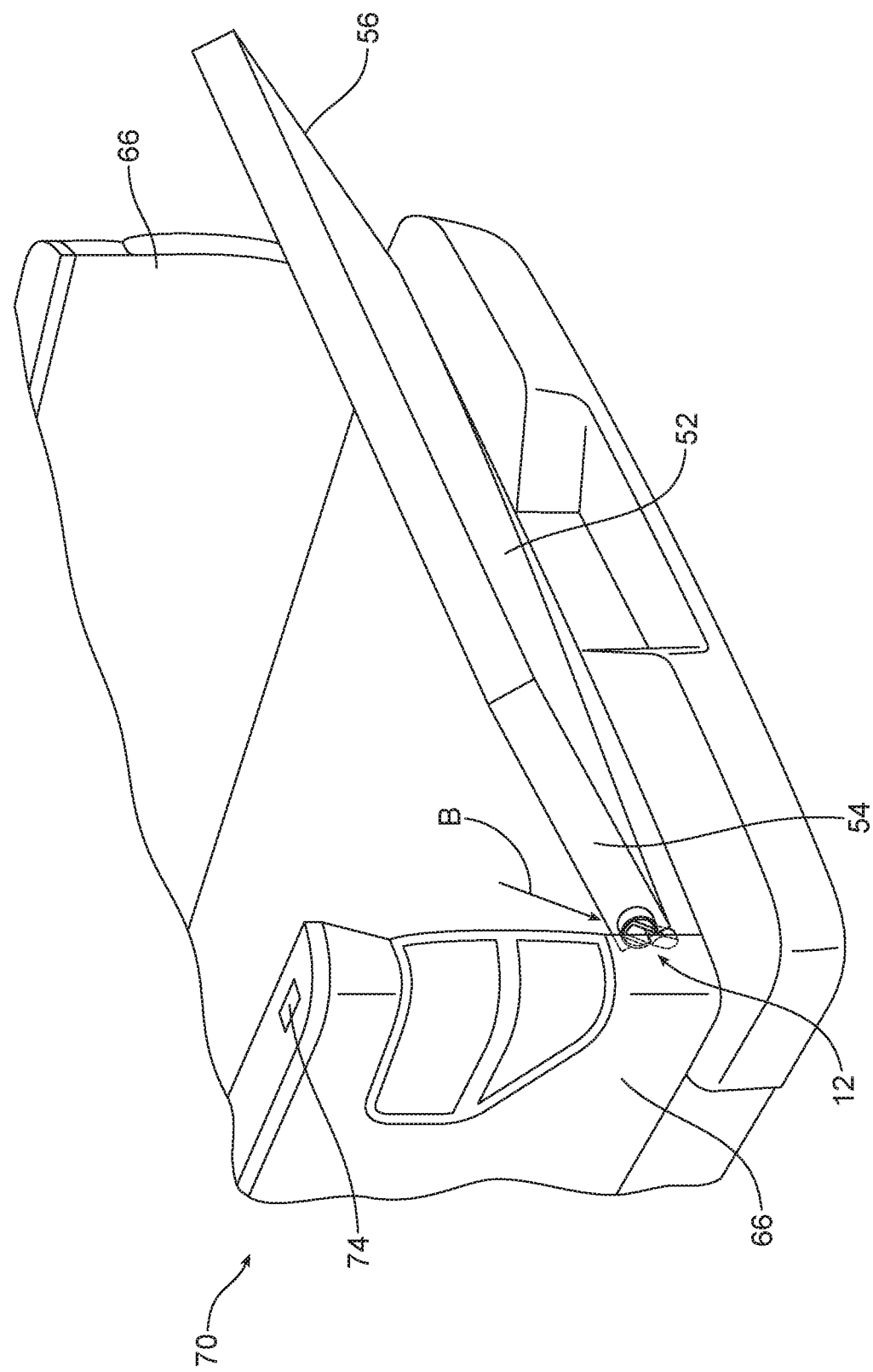

SMART HINGE ASSEMBLY FOR A TAILGATE OF A MOTOR VEHICLE

TECHNICAL FIELD

This document relates generally to the motor vehicle equipment field and, more particularly, to a new and improved smart hinge assembly that may be used as part of a powered tailgate assembly on a motor vehicle such as a pickup truck.

BACKGROUND

This document relates to a smart hinge assembly such as may be used as part of a powered tailgate assembly on a pickup truck or other motor vehicle. Advantageously, the smart hinge assembly incorporates an absolute position sensor for monitoring the angular orientation of the rotary drive cup of the smart hinge assembly. This current rotary drive cup position data can be used by a controller of the powered tailgate assembly to reorient the rotary drive cup into an installation position wherein a hinge pin socket in the rotary drive cup is properly aligned for installing a tailgate on the motor vehicle. Thus, the smart hinge assembly ensures that the powered hinge assembly is properly oriented for trouble-free and efficient installation.

SUMMARY

In accordance with the purposes and benefits described herein, a smart hinge assembly is provided. That smart hinge assembly comprises a fixed hinge pin, a rotary drive cup including a hinge pin socket to engage the fixed hinge pin and a drive cup position sensor. The drive cup position sensor is configured to monitor a current rotary position of the rotary drive cup.

In one possible embodiment, the drive cup position sensor comprises an absolute position sensor including a sensing element keyed to the rotary drive cup by a cooperating key and keyway. In such an embodiment, the rotary drive cup may include a drive shaft. The key may be provided on the drive shaft and the keyway that receives the key may be provided on the sensing element.

The smart hinge assembly may further include a fixed cup having a cylindrical sidewall that is oriented concentrically around the rotary drive cup. That cylindrical sidewall may include a hinge pin passage. The hinge pin socket in the rotary drive cup may include an open end. The open end is aligned with the hinge pin passage when the rotary drive cup is in an installation position allowing one to install the tailgate on the motor vehicle.

In yet another possible embodiment, the drive cup position sensor is a Hall effect sensor. In such an embodiment, the smart hinge assembly further includes a magnetic marker carried on the rotary drive cup.

The rotary drive cup may also include a drive shaft and the magnetic marker may be fixed to that drive shaft. That magnetic marker may comprise a diametrically magnetized ring-shape permanent magnet extending concentrically around the drive shaft.

The smart hinge assembly may further include a fixed cup having a cylindrical sidewall oriented concentrically around the rotary drive cup. That cylindrical sidewall may include a hinge pin passage. The hinge pin socket in the rotary drive cup may include an open end. That open end may be aligned with the hinge pin passage when the rotary drive cup is in an installation position allowing one to install the tailgate on the motor vehicle.

In the following description, there are shown and described several preferred embodiments of the smart hinge assembly such as may be used in installing a powered tailgate onto a motor vehicle. As it should be realized, the smart hinge assembly is capable of other, different embodiments and its several details are capable of modification in various, obvious aspects all without departing from the smart hinge assembly as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the smart hinge assembly, and together with the description serve to explain certain principles thereof.

FIGS. 5a and 5b illustrate a first embodiment of smart hinge assembly useful in the powered tailgate assembly and powered hinge assembly illustrated in the preceding drawing figures.

FIGS. 7a-7d are a series of illustrations showing how the tailgate is installed on the motor vehicle.

Reference will now be made in detail to the present preferred embodiments of the powered hinge assembly and powered tailgate assembly, examples of which are illustrated in the accompanying drawing figures.

DETAILED DESCRIPTION

Figure 1:
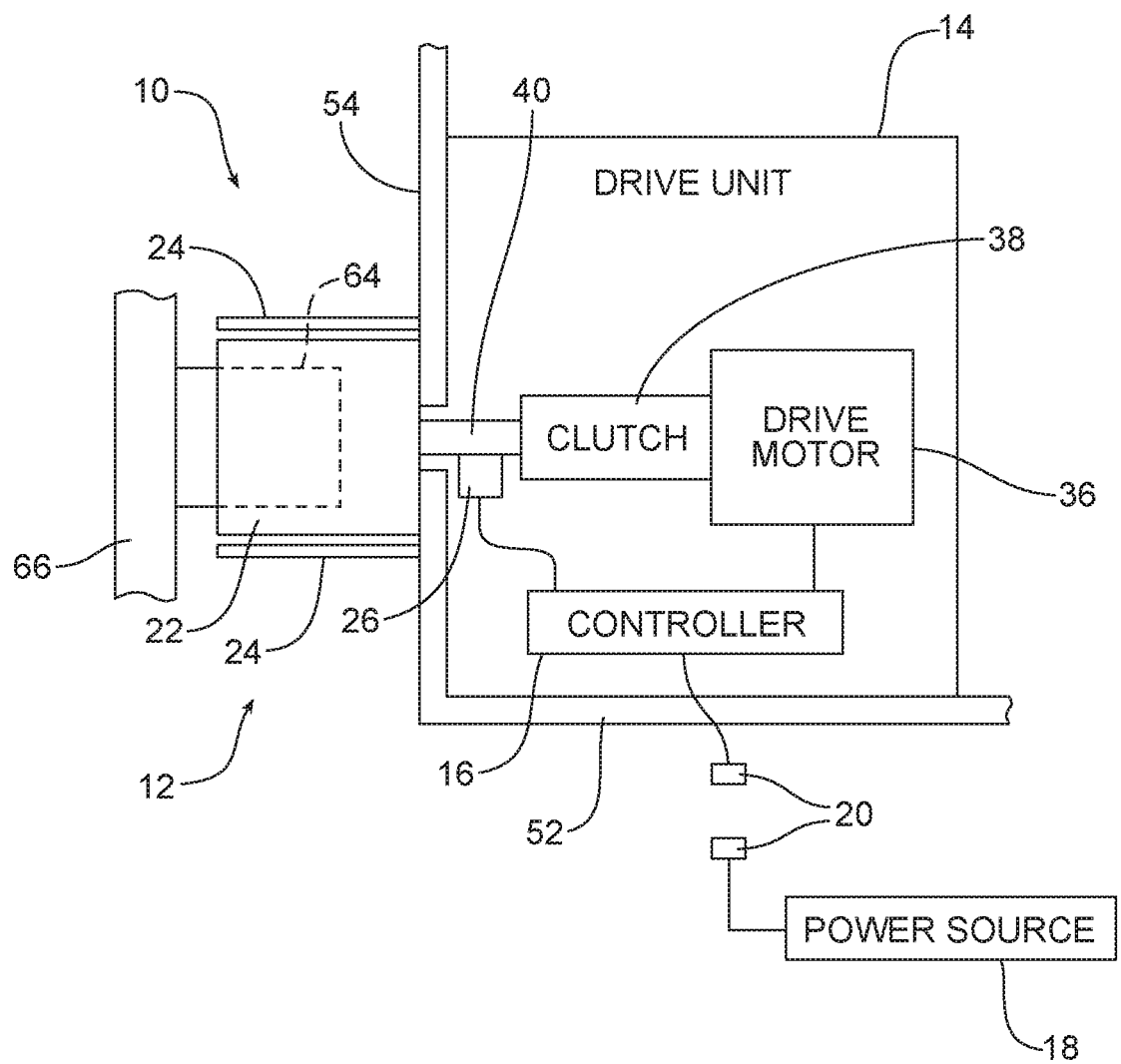
FIG. 1 is a schematic block diagram of the powered hinge assembly.
Figure 2:
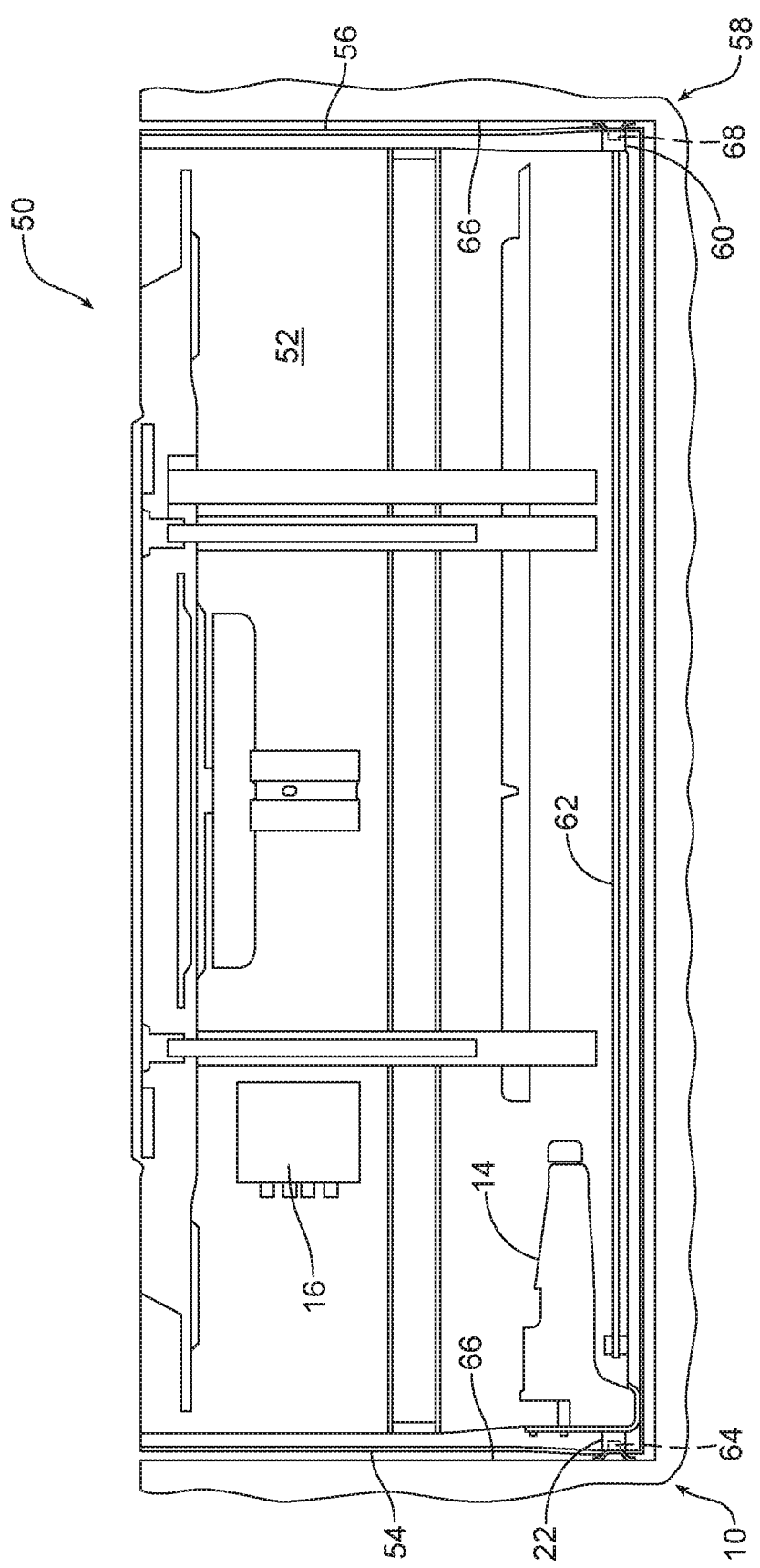
FIG. 2 is a schematic plan illustration of the powered tailgate assembly incorporating the powered hinge assembly illustrated in FIG. 1.

Reference is now made to FIG. 1 which schematically illustrates the powered hinge assembly 10. That powered hinge assembly 10 includes a first gate hinge feature 12, a drive unit 14 connected to the first gate hinge feature and a controller 16. The controller 16 may comprise a computing device such as a dedicated microprocessor or electronic control unit (ECU) operating in accordance with instructions from appropriate control software. Thus, the controller 16 may comprise one or more processors, one or more memories and one or more network interfaces all in communication with each other over a communication bus. In the illustrated embodiment, the controller 16 is part of the drive unit 14. Here, it should be appreciated that the controller 16 could be a component separate from the drive unit 14 in some possible embodiments as illustrated in FIG. 2.

As described in greater detail below, the controller 16 is configured to displace the first gate hinge feature 12 to an installation position upon connection of the controller 16 to a power source 18 by means of the plug-in connector 20.

Figure 3A:
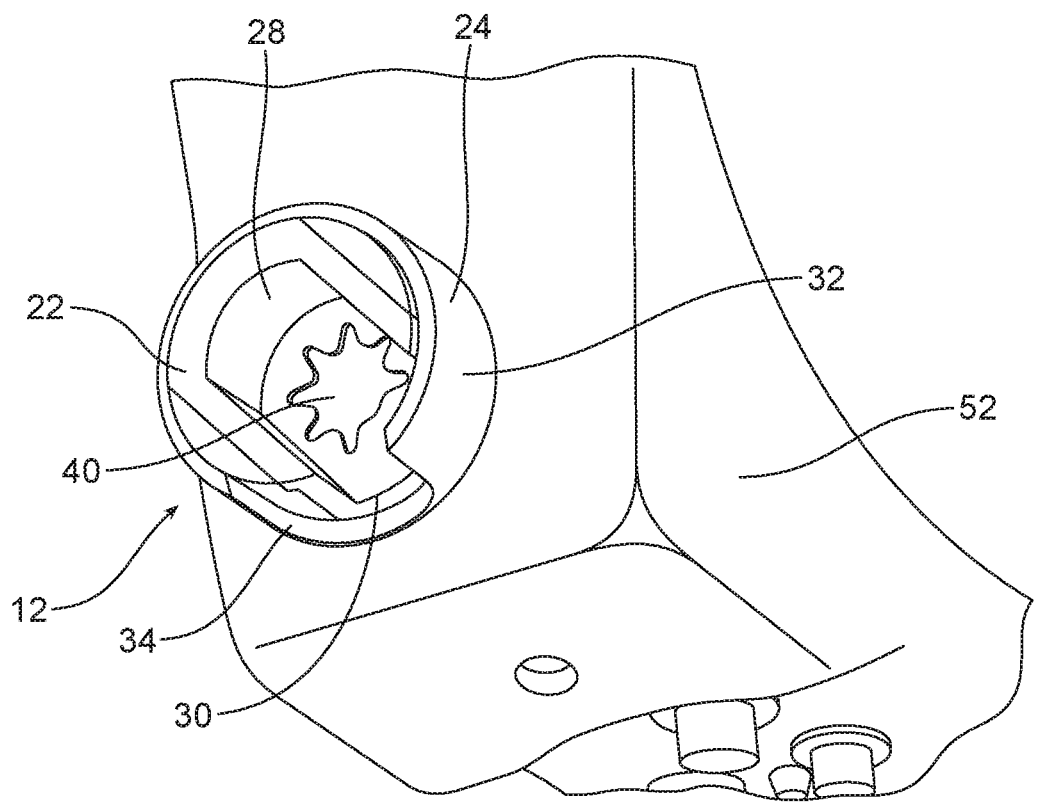
FIG. 3a is a detailed perspective view of the first gate hinge feature of the powered hinge assembly showing the open end of the drive cup misaligned with the first hinge pin passage in the cylindrical wall of the encircling fixed cup.
Figure 3B:
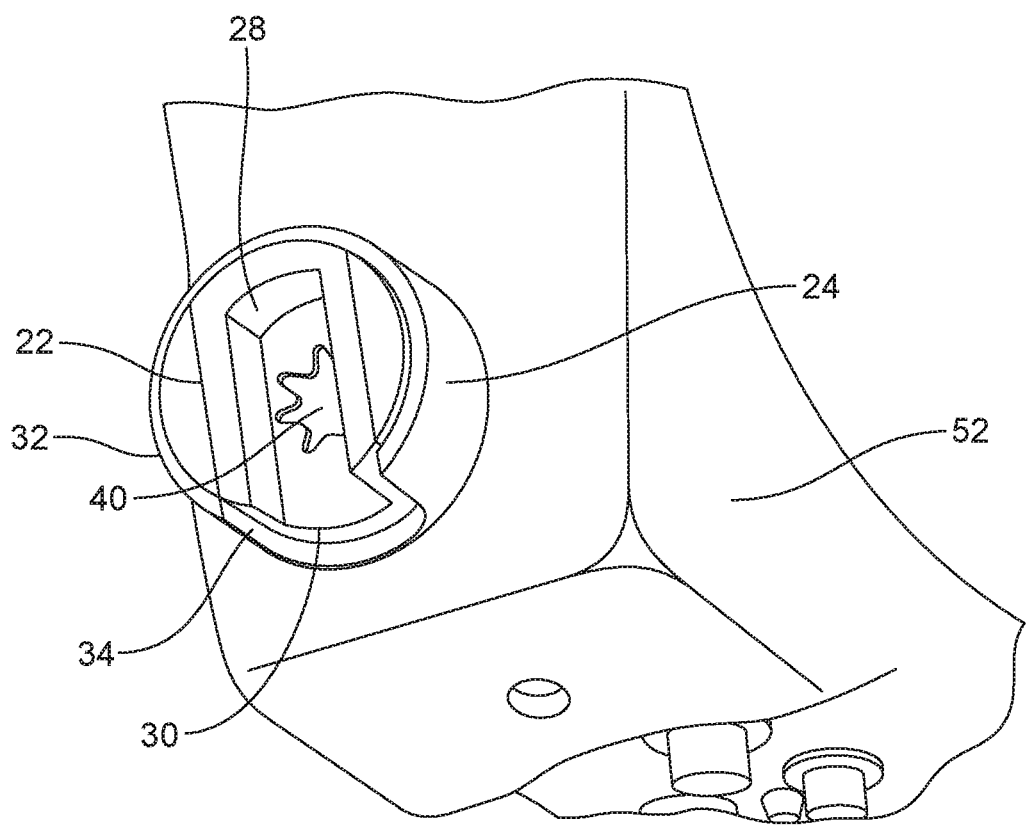
FIG. 3b is a view similar to FIG. 3a but showing the open end of the first hinge pin socket of the drive cup aligned with the hinge pin passage provided in the cylindrical wall of the fixed cup to allow easy installation of the tailgate on the motor vehicle.

As best illustrated in FIGS. 1, 3a and 3b, the first gate hinge feature 12 includes a drive cup 22, a fixed cup 24 and an integrated drive cup position sensor 26. The drive cup position sensor 26 may comprise an absolute position sensor or a rotary position sensor. Such a sensor is available from Microelectronic Integrated Systems as a model MLX90316 rotary position sensor. This is just one example and should not be considered limiting in scope. Potentiometers, Hall effect or other types of sensors may be utilized. As best illustrated in FIGS. 3a and 3b, the drive cup 22 includes a hinge pin socket 28 having an open end 30. The fixed cup 24 includes a cylindrical wall 32 having a hinge pin passage 34.

As illustrated in FIG. 1, in addition to the controller 16, the drive unit 14 includes a drive motor 36, a normally dis-engaged clutch 38 and an output 40 splined to or otherwise connected to the drive cup 22. Here it should be appreciated that the integrated drive cup position sensor 26 may be keyed to or otherwise connected to the output 40 or the drive cup 22. The drive cup position sensor 26 is configured to monitor a current position of the drive cup 22 and provide current drive cup position data to the controller 16.

Figure 4:
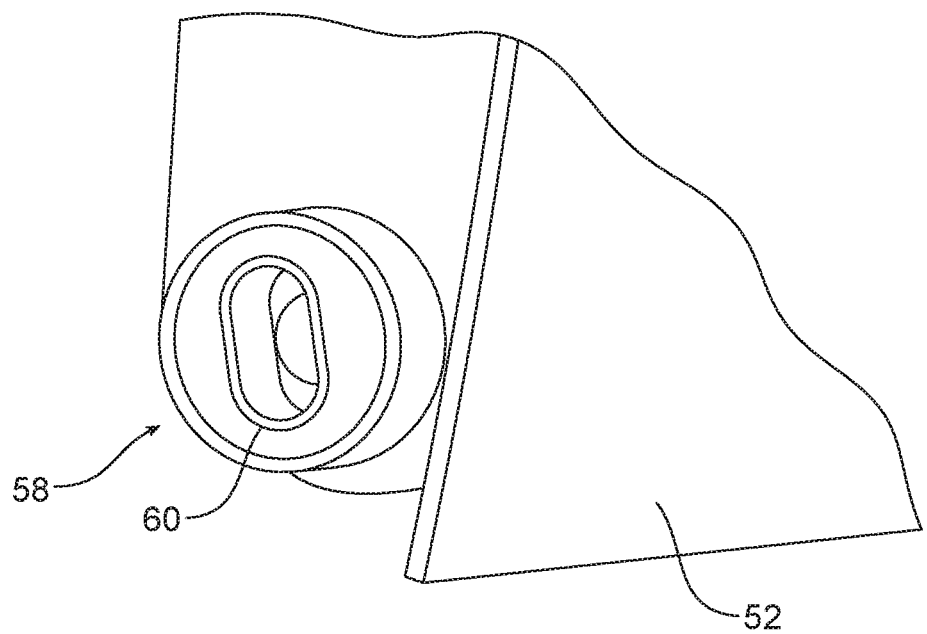
FIG. 4 is a detailed perspective view of the second hinge pin socket of the torque hinge assembly.

Reference is now made to FIG. 2 illustrating a powered tailgate assembly 50 that incorporates the powered hinge assembly 10 illustrated in FIG. 1. As illustrated in FIG. 2, the powered tailgate assembly 50 includes a tailgate 52 having a first end 54 and a second end 56. The powered hinge assembly 10 is provided at the first end 54 of the tailgate. A torque hinge assembly 58 is provided at the second end 56 of the tailgate 52. In the illustrated embodiment, the torque hinge assembly 58 includes a second hinge pin socket 60 carried on a torque rod 62. See also FIG. 4. Here it should be appreciated that the first hinge pin socket 28 of the powered hinge assembly 10 and the second hinge pin socket 60 of the torque hinge assembly 58 are coaxial and together, they define the pivot axis for the tailgate 52 when it is mounted to a motor vehicle.

As also illustrated in FIG. 2, the powered hinge assembly 10 also includes a first hinge pin 64 carried on or fixed to the motor vehicle body 66 adjacent the first end 54 of the tailgate 52. Similarly, the torque hinge assembly 58 includes a second hinge pin 68 carried on or fixed to the motor vehicle body 66 adjacent the second end 56 of the tailgate 52. When the tailgate 52 is properly installed on the motor vehicle, the first hinge pin 64 is received and held in the first hinge pin socket 28 of the drive cup 22 of the powered hinge assembly 10 while the second hinge pin 68 is received and held in the second hinge pin socket 60 of the torque hinge assembly 58.

Figure 5B:
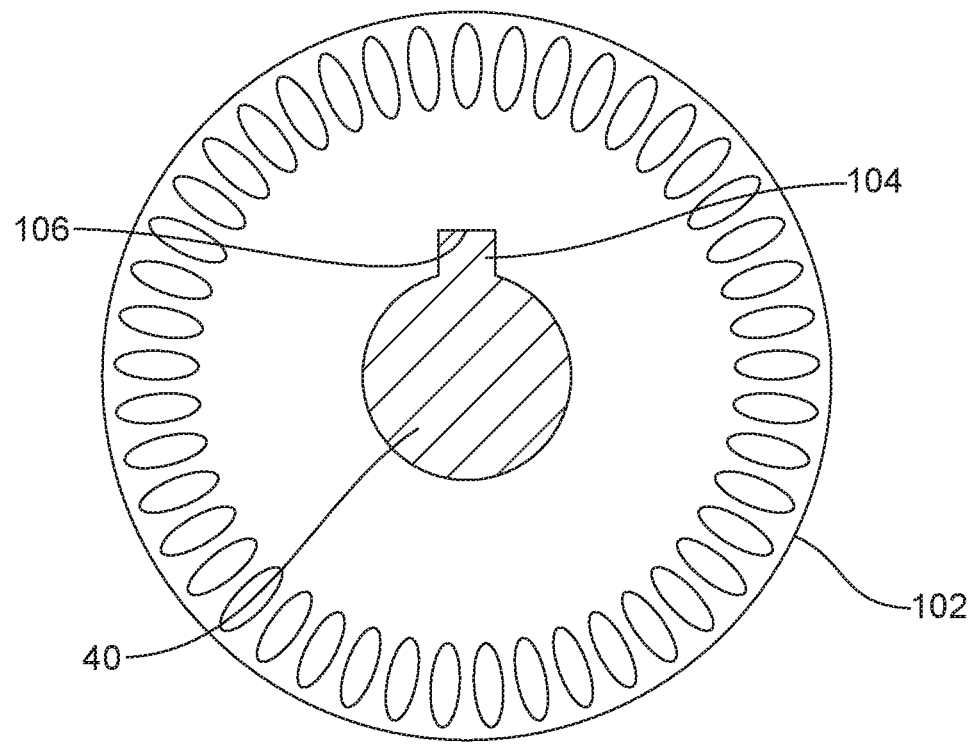

The first gate hinge feature 12 and the first hinge pin 64 may comprise a component assembly known as a "smart hinge assembly." FIGS. 5a and 5b illustrate a first possible embodiment of smart hinge assembly 100. The smart hinge assembly 100 includes: (a) the fixed hinge pin 64, (b) the rotary drive cup 22, including the hinge pin socket 28 to engage the fixed hinge pin and (c) the drive cup position sensor 26 (see also FIG. 3a). In the embodiment illustrated in FIGS. 5a and 5b, the drive cup position sensor 26 comprises an absolute position sensor including a sensing element 102 keyed to the rotary drive cup 22 by a cooperating key 104 and keyway 106. The sensing element 102 may comprise a rotary shaft encoder such as the illustrated coded disc.

More specifically, in the embodiment illustrated in FIGS. 5a and 5b, the rotary drive cup 22 includes the output or drive shaft 40. The key 104 is a lug or spline provided on the output or drive shaft 40 and the keyway 106, that receives the key, is provided in sensing element 102. Thus, the sensing element 102 is connected to and turns with the output/drive shaft 40 and the rotary drive cup 22 thereby monitoring the current angular position thereof.

When the rotary drive cup 22 is in the installation position, the open end 30 of the hinge pin socket 28 is aligned with the hinge pin passage 34 in the cylindrical sidewall 32 of the fixed cup 24 as illustrated in FIG. 3b. The drive cup position sensor 26 is configured to monitor the current rotary position of the rotary drive cup 22 and provide data indicating such to the controller 16 in the manner described in detail at other points in this document.

Figure 6:
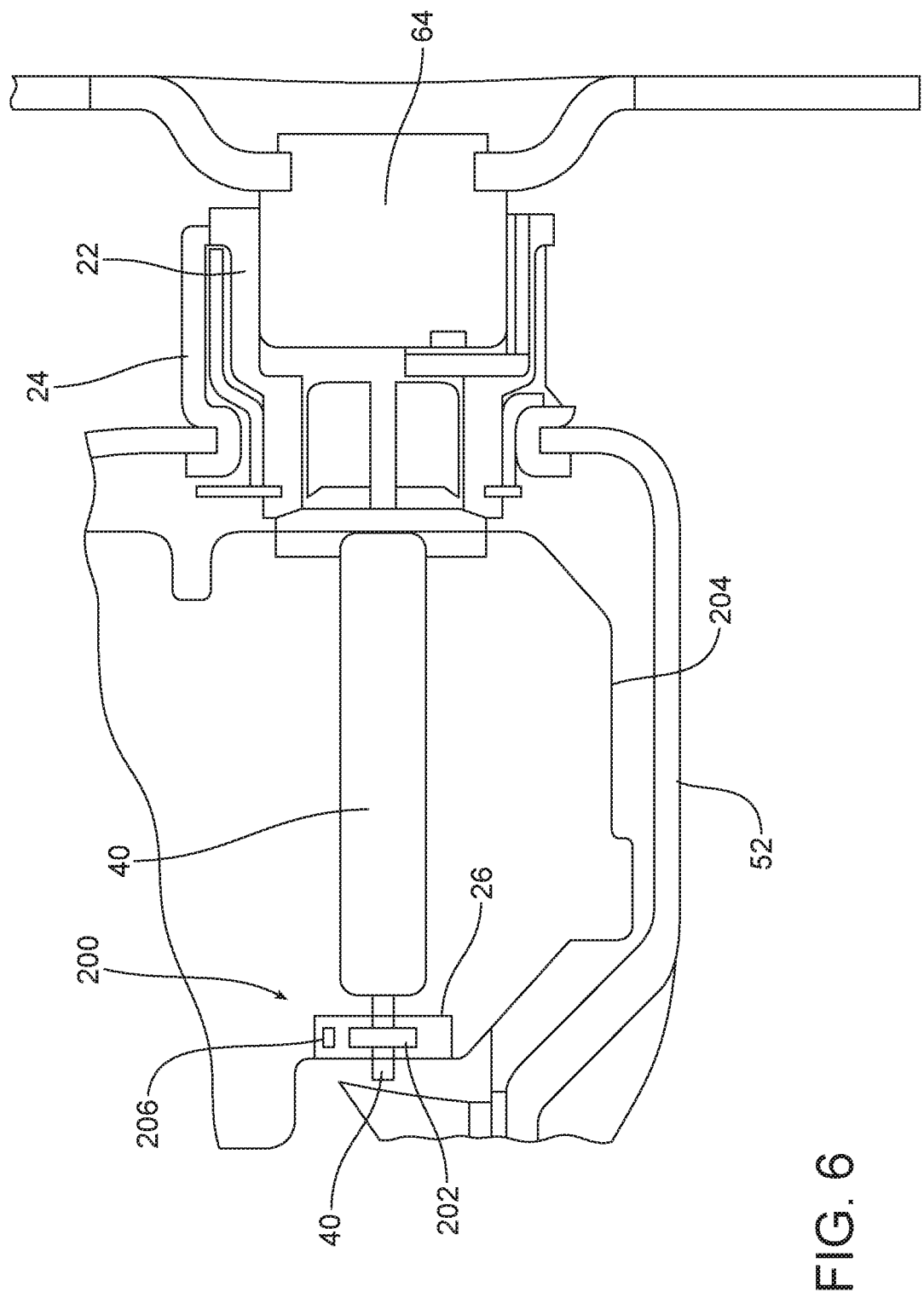
FIG. 6 illustrates a second embodiment of smart hinge assembly useful in the powered tailgate assembly and powered hinge assembly illustrated in FIGS. 1, 2, 3a, 3b, 4 and 7a-7d.

A second possible embodiment of smart hinge assembly 200 is illustrated in FIG. 6. The smart hinge assembly 200 includes: (a) the fixed pin 64; (b) the rotary drive cup 22, including the hinge pin socket 28 to engage the fixed hinge pin and (c) the drive cup position sensor 26. In the embodiment illustrated in FIGS. 6a and 6b, the drive cup sensor 26 is an absolute rotary position Hall effect sensor.

A magnetic marker 202 is carried on the rotary drive cup 22. More specifically, in the illustrated embodiment, the rotary drive cup 22 includes the output or drive shaft 40 and the magnetic marker 202 is fixed to the drive shaft. In one possible embodiment, the magnetic marker 202 is a diametrically magnetized ring-shape permanent magnet extending concentrically around the output/drive shaft 40 within the transmission housing 204. The drive cup position sensor 26 includes a sensing element 206 that measures radial and tangential magnetic flux components as the magnetic marker 202 rotates with the output/drive shaft 40 and rotary drive cup 22 thereby monitoring the current angular position thereof.

When the rotary drive cup 22 is in the installation position, the open end 30 of the hinge pin socket 28 is aligned with the hinge pin passage 34 in the cylindrical sidewall 32 of the fixed cup 24 as illustrated in FIG. 3b. The drive cup position sensor 26 is configured to monitor the current rotary position of the rotary drive cup 22 and provide data indicating such to the controller 16 in the manner described in detail at other points in this document.

Figure 7B:
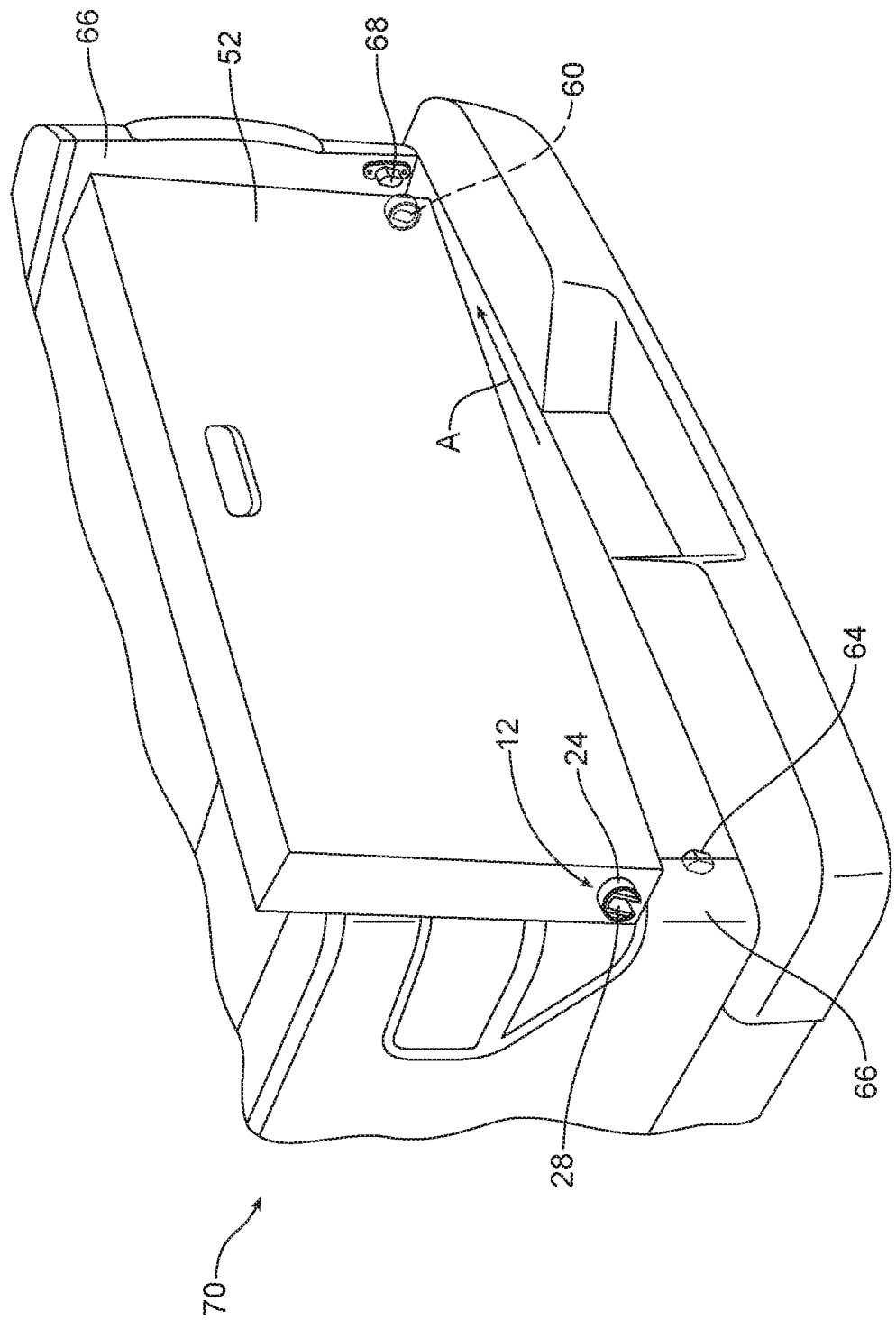
Figure 7D:
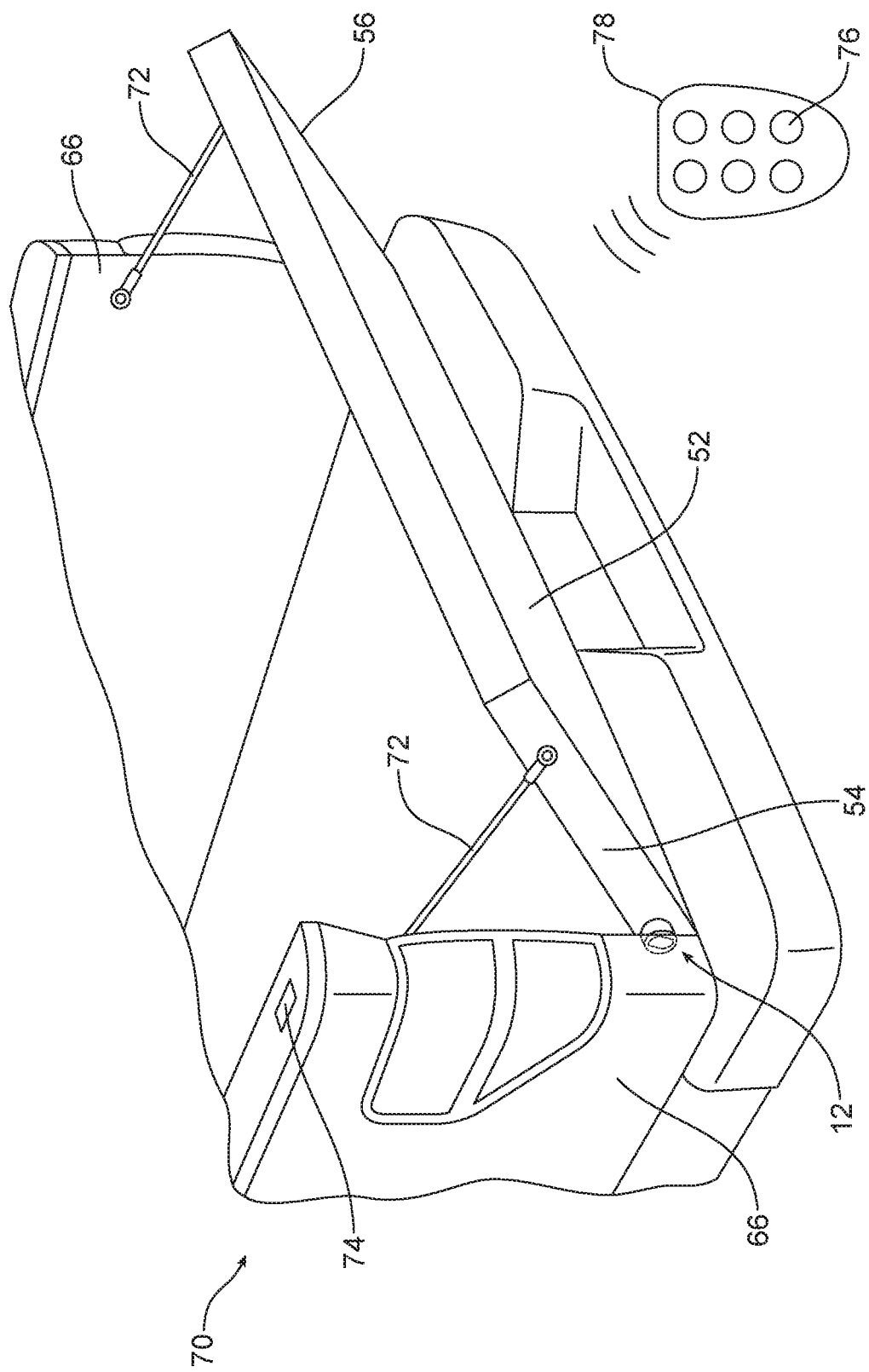

Reference is now made to FIGS. 7a-7d which illustrate a method of installing a tailgate 52 onto a motor vehicle. As illustrated in FIG. 7a, the tailgate 52 is detached from the motor vehicle 70 leaving the first hinge pin 64 and the second, opposed hinge pin 68 on the motor vehicle body side 66 exposed.

As illustrated in FIG. 7b, the method of installing the tailgate 52 includes assembling the torque hinge assembly 58 at the second end 56 of the tailgate 52 by inserting the second hinge pin socket 60 over the second hinge pin 68. This is done by positioning the tailgate 52 at a first angular orientation of about 80° with respect to horizontal and 10° with respect to vertical and aligning the second hinge pin socket 60 on the end of the now-detensioned torque rod 62 with the second hinge pin 68. The tailgate 52 is then shifted laterally in the direction of action arrow A to insert the second hinge pin 68 into the second hinge pin socket 60 or, stated another way, nest the second hinge pin socket 60 over the second hinge pin 68.

The method of installation also includes configuring the controller 16 to displace the first gate hinge feature 12 of the powered hinge assembly 10 to an installation position upon connection to a power source 18. More specifically, either prior to or after assembling the torque hinge assembly 58 as described above, an individual connects the two halves of the connector 20 directing power from the power source 18 of the motor vehicle 70 to the controller 16. The controller 16 is configured to displace the first gate hinge feature 12 of the powered hinge assembly 10 to an installation position immediately following power up if it is not already in the installation position. Thus, controller 16 sends an appropriate control signal to the clutch 38 engaging the clutch, and to the drive motor 36 to drive the drive cup 22 from the misaligned position illustrated in FIG. 3*a* to the installation position illustrated in FIG. 3*b* wherein the open end 30 of the hinge pin socket 28 on the drive cup 22 is aligned with the hinge pin passage 34 in the cylindrical wall 32 of the fixed cup 24. The integrated drive cup position sensor 26 ensures the detection and correction of any misalignment as well as the proper orientation of the drive cup 22 in the installation position through communication of hinge drive cup position data to the controller 16.

The powered hinge assembly 10 is then assembled at a second angular orientation of the tailgate 52 wherein the tailgate forms an included angle of approximately 45° with the vertical and the horizontal. Note FIG. 7*c*. At this angular orientation, the tailgate 52 is moved in the direction of action arrow B so that the aligned hinge pin passage 34 and open end 30 of the first gate hinge feature 12 overlie the first hinge pin 64 and that first hinge pin is then passed through the hinge pin passage 34 and the open end 30 and installed in the hinge pin socket 28 by lowering the tailgate into position. The stay cables 72 are connected to the tailgate 52 and the operator may then manually lower or close the tailgate 52 (see FIG. 7*d*). Alternatively, the tailgate 52 may be automatically lowered or closed by means of the drive unit 14 when the controller 16 responds to a command signal generated utilizing operator control switches 74 provided, for example, on a sidewall 66 of the motor vehicle or appropriate control buttons 76 on a key fob 78 of the motor vehicle. In still other embodiments of motor vehicles appropriately equipped, voice commands may be utilized for this purpose.

As should be appreciated, the clutch 38 is only engaged when the appropriate command has been received by the controller 16 to raise or lower the tailgate utilizing the drive unit 14. At all other times, the clutch 38 remains dis-engaged to allow manual raising and lowering of the tailgate.

When one wishes to again remove the tailgate 52 from the motor vehicle, one may lower the tailgate with the appropriate "lower" command from the switches 74 or control buttons 76 of the key fob 78. Next, the connector 20 is disconnected so that the controller 16 is disconnected from the power source 18. Next, one manually raises the tailgate 52 to an angular orientation of about 45° and the left and right side stay cables 72 are disconnected. Next, the first end 54 of the tailgate is lifted, the aligned open end 30 of the hinge pin socket 28 and hinge pin passage 34 allowing the removal of the first gate hinge feature 12 from the first hinge pin 64.

Once the powered hinge assembly 10 has been disassembled or disconnected, the lift gate 52 is reoriented at an angle of approximately 80° so as to de-tension the torque rod 62. The tailgate 52 is then pulled toward the first end 54 in a cross-car direction (opposite to action arrow A in FIG. 7*b*) so as to clear the vehicle box and pull the second hinge pin socket 60 off the second hinge pin 68 thereby fully disengaging the tailgate 52 from the motor vehicle 70.

The powered hinge assembly 10 and the powered tailgate assembly 50 provide a number of benefits and advantages. They provide for seamless manual and automated control for the raising and lowering of the tailgate 52 on the motor vehicle 70. When the tailgate 52 is disconnected from the motor vehicle, the normally dis-engaged clutch 38 may allow the drive 22 to rotate with respect to the fixed cup 24 so that the open end 30 of the hinge pin socket 28 becomes misaligned with the hinge pin passage 34 in the cylindrical wall 32 of the fixed cup 24. This could interfere or even prevent reinstallation of the tailgate 52 on the pickup truck 70 if that misalignment remains undetected and uncorrected. In order to avoid this issue and provide easy and efficient reinstallation, the controller 16 of the drive unit 14 is configured to automatically displace the drive cup 22 to an installation position where the open end 30 and hinge pin passage 34 are fully aligned for ease of installation. This "installation reset" is done automatically at power up when the controller 16 is connected to the power source 18 by connection of the wiring harness connector 20.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A smart hinge assembly, comprising:
a fixed hinge pin;
a rotary drive cup including a hinge pin socket engaging with said fixed hinge pin; and
a drive cup position sensor configured to monitor a current rotary position of said rotary drive cup, wherein said drive cup position sensor includes an absolute position sensor including a sensing element keyed to said rotary drive cup by a cooperating key and keyway and wherein said rotary drive cup includes a drive shaft and wherein said cooperating key is provided on said drive shaft and said keyway is provided on said sensing element.

2. The smart hinge assembly of claim 1, further including a fixed cup having a cylindrical sidewall oriented concentrically around said rotary drive cup.

3. The smart hinge assembly of claim 2, wherein said cylindrical sidewall includes a hinge pin passage and said hinge pin socket includes an open end, said open end being aligned with said hinge pin passage when said rotary drive cup is in an installation position.

4. The smart hinge assembly of claim 1, further including a magnetic marker carried on said rotary drive cup.

5. The smart hinge assembly of claim 4, wherein said magnetic marker is fixed to said drive shaft.

6. The smart hinge assembly of claim 5, wherein said magnetic marker is a diametrically magnetized ring-shape permanent magnet extending concentrically around said drive shaft.

7. The smart hinge assembly of claim 6, further including a fixed cup having a cylindrical sidewall oriented concentrically around said rotary drive cup.

8. The smart hinge assembly of claim 7, wherein said cylindrical sidewall includes a hinge pin passage and said hinge pin socket includes an open end, said open end being aligned with said hinge pin passage when said rotary drive cup is in an installation position.

9. The smart hinge assembly of claim 1, further including a drive unit including a drive motor connected to said rotary drive cup via the drive shaft. said magnetic marker is fixed to said drive shaft.

10. The smart hinge assembly of claim 9, further including a controller configured to displace said drive cup to an installation position upon connection of said controller to a power source.

11. The smart hinge assembly of claim 10, wherein said drive unit further includes a normally dis-engaged clutch.

* * * * *

UNITED STATES PATENT AND TRADEMARK OFFICE
CERTIFICATE OF CORRECTION

PATENT NO. : 10,731,395 B2
APPLICATION NO. : 15/459120
DATED : August 4, 2020
INVENTOR(S) : Rafic Jergess et al.

Page 1 of 1

It is certified that error appears in the above-identified patent and that said Letters Patent is hereby corrected as shown below:

In the Claims

Column 7, Line 56, please replace "via the drive shaft. said magnetic marker is fixed to said drive shaft." with -- via the drive shaft. --.

Signed and Sealed this
Sixth Day of October, 2020

Andrei Iancu
*Director of the United States Patent and Trademark Office*